United States Patent Office 3,125,409
Patented Mar. 17, 1964

3,125,409
RECOVERY OF URANIUM FROM GAS MIXTURE
Stanley H. Jury, Knoxville, Tenn., assignor to the United States of America as represented by the United States Atomic Energy Commission
No Drawing. Filed May 20, 1954, Ser. No. 431,305
12 Claims. (Cl. 23—14.5)

Generally, this invention relates to the chemistry of uranium; particularly, the invention relates to the recovery of uranium hexafluoride from other fluorine-containing gases.

The selective recovery of uranium present in small quantity with other gases has been a difficult, although important problem. One reason for the difficulty is the extreme reactivity of uranium hexafluoride. To avoid the difficult problems due to the reactivity of uranium hexafluoride, cold traps have been used. However, when hydrogen fluoride is present, it condenses with the uranium hexafluoride. The hydrogen fluoride and uranium hexafluoride are so similar in physical properties that their complete separation is difficult. Various adsorbents or absorbents have been used, for example alumina, activated carbon and soda lime. Each has its disadvantages: from alumina the adsorbed uranium may be recovered only with great difficulty. Activated carbon may react violently and explosively with uranium hexafluoride. The reaction with soda lime is undesirably highly exothermic and the reaction product is difficult to separate.

Accordingly, it is a general object of this invention to provide a new method for separating uranium from a mixture of gases comprising uranium hexafluoride. A more specific object of the invention is to provide a method of separating small quantities of uranium hexafluoride from relatively large quantities of hydrogen fluoride. A still more specific object of the invention is to provide a selective adsorbent for uranium hexafluoride from which the uranium is relatively easily recovered.

Other objects will appear hereinafter.

Broadly speaking, the present invention comprises bringing anhydrous calcium sulfate and a gaseous mixture containing uranium hexafluoride into contact to cause the uranium hexafluoride to be adsorbed preferentially by the calcium sulfate and thereafter recovering the uranium from the calcium sulfate, preferably by means of a preferential solvent for the adsorbed uranium. I have also discovered that the adsorbed uranium may be readily recovered by leaching the calcium sulfate with water. This process is especially suited to the separation of uranium hexafluoride from hydrogen fluoride.

The following examples are presented as illustrations of the present invention with the understanding, however, that it is not intended that these examples should limit the scope of the invention.

EXAMPLE 1

Anhydrous, commercial-grade calcium sulfate was crushed and screened to form pellets 14 to 18 mesh in size. 219.1 grams of the calcium sulfate pellets were loaded into a cylinder fabricated of a material resistant to the fluoride-containing gases, in this case, fabricated of a solid polymer of trifluorochloroethylene. A gaseous mixture containing uranium hexafluoride was then flowed through the bed of calcium sulfate at a rate of 500 standard cubic centimeters per minute. The nominal composition of the gas mixture was 65% hydrogen, 30% hydrogen fluoride and 5% uranium hexafluoride, the percentages being molar. The gas was flowed continuously through the bed for 1½ hours and periodic analyses of the exit gas were made. The results obtained are shown in Table 1.

Table 1

| Elapsed Time (hours) | $UF_6$ Concentration (Mole percent) | |
| --- | --- | --- |
| | Feed | Exit Gas |
| 0.25 | 7.35 | |
| 0.5 | | 0.0008 |
| 0.75 | | 0.0002 |
| 1.0 | | 1.78 |
| 1.25 | 6.77 | |
| 1.5 | | 5.1 |

It was found that at the end of the hour and a half, the calcium sulfate had gained 24.6 grams in weight. From its uranium content, it had adsorbed 19.9 grams of uranium hexafluoride and only 4.7 grams of hydrogen fluoride.

The pressure drop through the bed of calcium sulfate was only 0.2 inch of mercury. The reaction was smooth and large quantities of heat were not liberated. This was readily observed by noting that the maximum change in temperature of the bed from room temperature was only 10° C. This example illustrates the efficiency of anhydrous calcium sulfate in adsorbing uranium hexafluoride.

EXAMPLE 2

This example illustrates the efficacy of anhydrous calcium sulfate in separating uranium hexafluoride from relatively large quantities of hydrogen fluoride. A bed of 202.7 grams of anhydrous calcium sulfate was prepared similar to that of Example 1. First, the calcium sulfate was saturated with hydrogen fluoride by flowing 150 cubic centimeters per minute of pure hydrogen fluoride (measured at standard conditions) through the bed until no more was absorbed. Saturation was indicated by return to the starting temperature after the temperature had risen 42° C. Then, with the bed of calcium sulfate at room temperature, a gas mixture having the same nominal compositions as that used in Example 1 was flowed through it. The results obtained are indicated in Table 2.

Table 2

| Elapsed Time (hours) | $UF_6$ Concentration (Mole percent) | |
| --- | --- | --- |
| | Feed | Exit Gas |
| 0.25 | | 0.0016 |
| 0.35 | 4.53 | |
| 0.5 | | 0 |
| 0.75 | | 0 |
| 1.0 | | 0.355 |
| 1.1 | 5.30 | |
| 1.25 | | 2.79 |

It was found that the calcium sulfate had adsorbed 18.2 grams of uranium hexafluoride and only 6.1 grams of hydrogen fluoride overall including the amount derived from the treatment of the calcium sulfate with pure hydrogen fluoride. The weight percentage of $UF_6$ adsorbed (based on the weight of calcium sulfate) was essentially the same in this example (9.0%) as it had been in the previous one (9.1%). In fact, it was found that hydrogen fluoride is displaced by the uranium hexafluoride.

In this example again only a small change in temperature was noted: the temperature fell 4° C. Again the pressure differential across the bed of calcium sulfate was only 0.2 inch of mercury.

Similar tests in which the calcium sulfate was saturated with fluorine by exposing it to a gas whose only active ingredient was 5% fluorine gas yielded similar results.

With the knowledge that calcium sulfate will preferentially adsorb uranium from a mixture of uranium hexafluoride with fluorine or with hydrogen fluoride, tests were conducted to find a method of recovering the adsorbed uranium from the calcium sulfate. I have found that substantially all the uranium is easily recovered by leaching the calcium sulfate with water at room temperature. In a number of experiments the uranium remaining in the water-extracted calcium sulfate was on an average 75 parts per million. I have found that still more uranium may be recovered by leaching the calcium sulfate with a boiling mixture of sulfuric and nitric acids, thereafter filtering the calcium sulfate from the solution, washing the solid with sulfuric acid and finally washing with water. After this treatment, less than 38 parts per million of uranium were found in the solid calcium sulfate.

In general, because it is easy to use and because it is inexpensive, I prefer to use water as the solvent. However, where more drastic methods of recovery are required in order to recover still more of the uranium, I prefer to use aqueous inorganic acids in which calcium fluoride and calcium sulfate are not more than slightly soluble. In general, a mixture of sulfuric and another strong mineral acid will satisfy these requirements.

Other methods of recovery may also be used. For example, a compound may be used that displaces uranium from the calcium sulfate bed by reason of its stronger affinity for calcium sulfate. Such a compound may be, for example, a relatively high molecular weight, fluorine-containing organic compound compatible with the fluoride system. Similarly, the uranium may be extracted by means of a selective extractant such as acidified hexone or diethyl ether or an acidified solution of tributyl phosphate in kerosene. Nitric acid is used in these selective extractants. If the uranium is desired in the form of its hexafluoride, it may be removed by elution with an inert gas, such as helium or krypton, at an elevated temperature after making certain that the uranium is in the form of the hexafluoride. However, unless another method is required in a particular situation, water is the preferred solvent for its convenience and economy.

Although I do not wish to be bound by any theory of the operation of this invention, it is my belief that the uranium hexafluoride reacts with the calcium sulfate in accordance with the following equation:

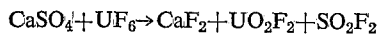

$$CaSO_4 + UF_6 \rightarrow CaF_2 + UO_2F_2 + SO_2F_2$$

It is apparent that this invention provides a relatively simple and effective means for recovering uranium from a mixture of uranium hexafluoride and other fluorine-containing gases. The step of adsorbing the uranium hexafluoride on anhydrous calcium sulfate is readily performed without the dangers of a violent or explosive reaction. Furthermore, the uranium is very readily recovered from the adsorbent by a simple leaching process which can be performed at room temperature. Of primary importance is the fact that this invention provides a simple, clean and very effective method of separating uranium hexafluoride and hydrogen fluoride.

In performing this invention, only the simplest equipment need be used, for example the bed of adsorbent may be supported on a screen in a cylindrical column with the gas preferably flowing upward through the bed. The equipment, of course, should be resistant to the gases being treated and it has been found that nickel or alloys of nickel such as stainless steels or monel are useful for this purpose. The equipment should be maintained at temperatures above the freezing point of uranium hexafluoride. Preferably the calcium sulfate pellets or particles are in the range of sizes between 3 mesh and 100 mesh. Particles smaller than 100 mesh, even though advantageous for their increased surface area, are uneconomical in operation because of increased pumping requirements resulting from a higher pressure drop through the bed. Other variations will be apparent to those skilled in the art.

Accordingly, the foregoing description is to be interpreted as illustrative only and not in any limiting sense. Rather, it is intended that the scope of the invention should be defined only by the claims hereinafter set forth.

What is claimed is:

1. A method of recovering uranium from a gaseous mixture of uranium hexafluoride and other gases that comprises bringing said mixture into contact with anhydrous calcium sulfate to adsorb the uranium hexafluoride preferentially on said sulfate and thereafter separating the adsorbed uranium from the calcium sulfate.

2. A method of separating uranium from a mixture of uranium hexafluoride and other gases that comprises bringing said mixture into contact with anhydrous calcium sulfate to adsorb the uranium hexafluoride on said sulfate preferentially and thereafter leaching the calcium sulfate with a selective solvent for the adsorbed uranium.

3. A method of separating uranium from a mixture of uranium hexafluoride and other inorganic fluorine-containing gases that comprises bringing said mixture into contact with anhydrous calcium sulfate to adsorb the uranium hexafluoride on said sulfate preferentially and thereafter leaching the calcium sulfate with a selective solvent for the adsorbed uranium.

4. A method of recovering uranium from a mixture of uranium hexafluoride and other inorganic fluorine-containing gases comprising flowing said mixture through a bed whose active ingredient is calcium sulfate to adsorb the uranium hexafluoride on the sulfate preferentially and thereafter leaching the calcium sulfate with a selective solvent for the adsorbed uranium.

5. The method of claim 4 in which the calcium sulfate is in the form of pellets.

6. The method of claim 5 in which the pellet size is in the range of 3 mesh to 100 mesh.

7. A method of recovering uranium from a mixture of uranium hexafluoride and other inorganic fluorine-containing gases comprising bringing asid mixture into contact with anhydrous calcium sulfate to adsorb the uranium hexafluoride on said sulfate preferentially and thereafter leaching the calcium sulfate with water to remove the adsorbed uranium preferentially.

8. A method of recovering uranium from a mixture of uranium hexafluoride and other inorganic fluorine-containing gases comprising bringing said mixture into contact with anhydrous calcium sulfate pellets having a particle size in the range of 3 mesh to 100 mesh to adsorb the uranium hexafluoride on said sulfate preferentially and thereafter leaching the calcium sulfate pellets with water to remove the adsorbed uranium preferentially.

9. A method of recovering uranium from a mixture of uranium hexafluoride and other inorganic fluorine-containing gases comprising bringing said mixture into contact with anhydrous calcium sulfate to adsorb the uranium hexafluoride preferentially on the sulfate and thereafter leaching the sulfate with an aqueous mineral acid solvent that preferentially dissolves the adsorbed uranium.

10. A method of recovering uranium from a mixture of uranium hexafluoride and other inorganic fluorine-containing gases comprising bringing said mixture into contact with anhydrous calcium sulfate to adsorb the uranium hexafluoride preferentially on the sulfate and thereafter leaching the sulfate with an aqueous solution of sulfuric acid and another mineral acid, said solution being a preferential solvent for the adsorbed uranium.

11. The method of claim 10 in which the other mineral acid is nitric acid.

12. The method of claim 10 in which the leaching is performed at the boiling point of the leaching solution.

References Cited in the file of this patent

UNITED STATES PATENTS 2,625,516    Metzger _____ Jan. 13, 1953